United States Patent [19]

Yamamoto et al.

[11] Patent Number: 5,212,725
[45] Date of Patent: May 18, 1993

[54] TELEPHONE BEING SIGNAL RESPONSIVE FOR EXTENDING AND RETRACTING AN ANTENNA

[75] Inventors: Yasuhiko Yamamoto, Hadano, Japan; Seiichi Tojo, Novi, Mich.

[73] Assignee: Nissan Motor Co., Ltd., Yokohama, Japan

[21] Appl. No.: 735,019

[22] Filed: Jul. 25, 1991

[30] Foreign Application Priority Data

Jul. 31, 1990 [JP] Japan .................................. 2-80661

[51] Int. Cl.⁵ ...................... H04M 11/00; H01Q 1/24; H01Q 1/10; H04B 1/06
[52] U.S. Cl. ......................................... 379/58; 379/61; 343/702; 343/903; 455/277.1; 455/276.1; 455/269; 455/130
[58] Field of Search ................... 379/56, 58, 61; 343/702, 712, 876, 893, 900, 903; 455/277.1, 276.1, 269, 130

[56] References Cited

U.S. PATENT DOCUMENTS

| | | | |
|---|---|---|---|
| 4,649,398 | 3/1987 | Yamamoto et al. | 343/903 |
| 4,675,687 | 6/1987 | Elliott | 343/903 |
| 4,862,182 | 8/1989 | Egashira | 343/702 |
| 4,942,311 | 7/1990 | Harada | 343/903 |
| 4,958,382 | 9/1990 | Imanishi | 455/277 |
| 4,990,929 | 2/1991 | Nakase et al. | 343/903 |
| 5,040,204 | 8/1991 | Sasaki et al. | 379/61 |

FOREIGN PATENT DOCUMENTS 0029047  3/1978  Japan .................................. 343/903

OTHER PUBLICATIONS

Oldsmobile Division, "1983 Oldsmobile Chassis Service Manual," Nov. 15, 1982.

*Primary Examiner*—Curtis Kuntz
*Assistant Examiner*—William D. Cumming
*Attorney, Agent, or Firm*—Lowe, Price, LeBlanc & Becker

[57] ABSTRACT

A telephone apparatus for a vehicle comprising a main antenna and a sub-antenna. The sub-antenna is operated to receive incoming electric waves including an incoming call signal. When the sub-antenna receives the incoming call signal or when an outgoing call signal is outputted, the main antenna is extended and an transmitter-receiver of the telephone apparatus is turned on. When the conversation by the telephone apparatus is finished, the main antenna in an extended condition is contracted and received in the vehicle, and the transmitter-receiver is turned off.

12 Claims, 3 Drawing Sheets

TELEPHONE BEING SIGNAL RESPONSIVE FOR EXTENDING AND RETRACTING AN ANTENNA

BACKGROUND OF THE INVENTION

1. Field of the Invention

The present invention relates to improvements in a telephone apparatus for a vehicle, and more particularly to a telephone apparatus which has a main antenna and a sub-antenna.

2. Description of the Prior Art

It is well known that a telephone apparatus for a vehicle is provided with an antenna which is installed to the outside portion of a vehicle body. Such an antenna is received in the vehicle by being manually detaching from the vehicle body or by being retracted by the drive of a motor in accordance with a passenger's intent.

However, the antenna must be kept in an extended condition for almost time since it is necessary that the antenna is set in an extended condition in order to detect an incoming call signal. Accordingly, this extended antenna causes a problem to generate a clashing noise between air, to be broken by some obstacles, and to degrade the outside view of the vehicle.

SUMMARY OF THE INVENTION

It is an object of the present invention to provide an improved telephone apparatus for a vehicle with which the above-mentioned drawbacks are overcome.

A telephone apparatus for a vehicle in accordance with the present invention, in which a telephone conversation is carried out through a main antenna, comprises a sub-antenna which receives an incoming call wave. A detector detects an incoming call signal from the incoming call wave. A controller executes a predetermined command in response to the incoming call signal.

With this arrangement, the main antenna 12 is retracted in the vehicle while the system is kept at an incoming call signal receivable condition. Accordingly, since the main antenna is received in the vehicle body except for a telephone using condition, some problems such as a generation of a clashing noise between air, the breakage by some obstacles, and the degradation of the outside view of the vehicle, are largely improved.

DETAILED DESCRIPTION OF THE INVENTION

Figure 1:
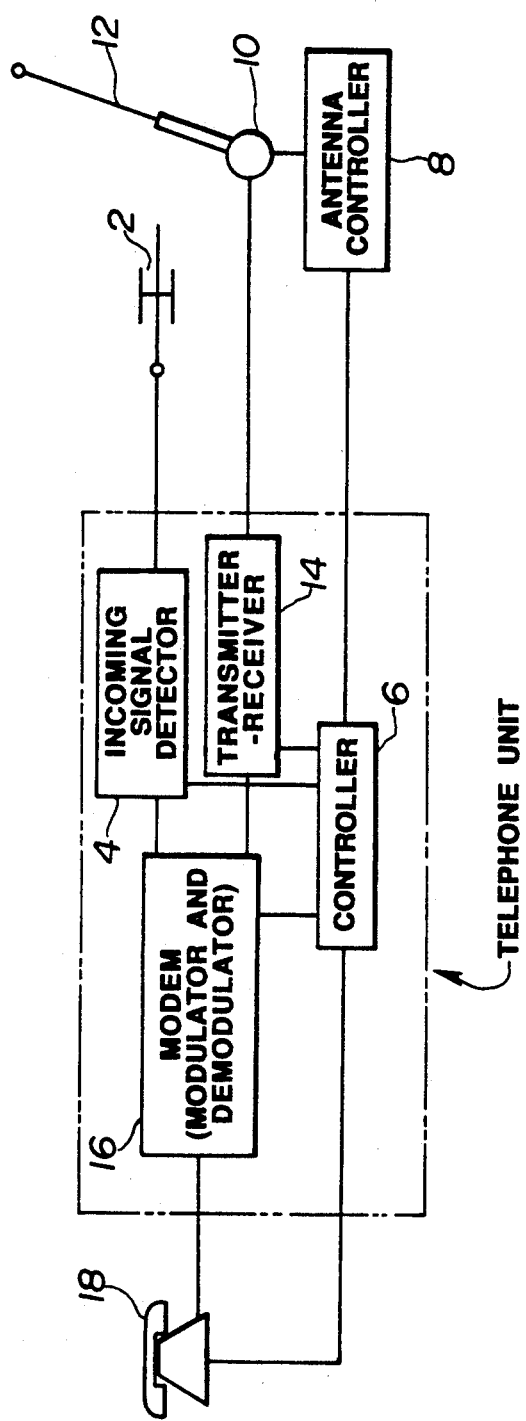
FIG. 1 is a schematic block diagram of a first embodiment of a telephone apparatus according to the present invention.
Figure 2:
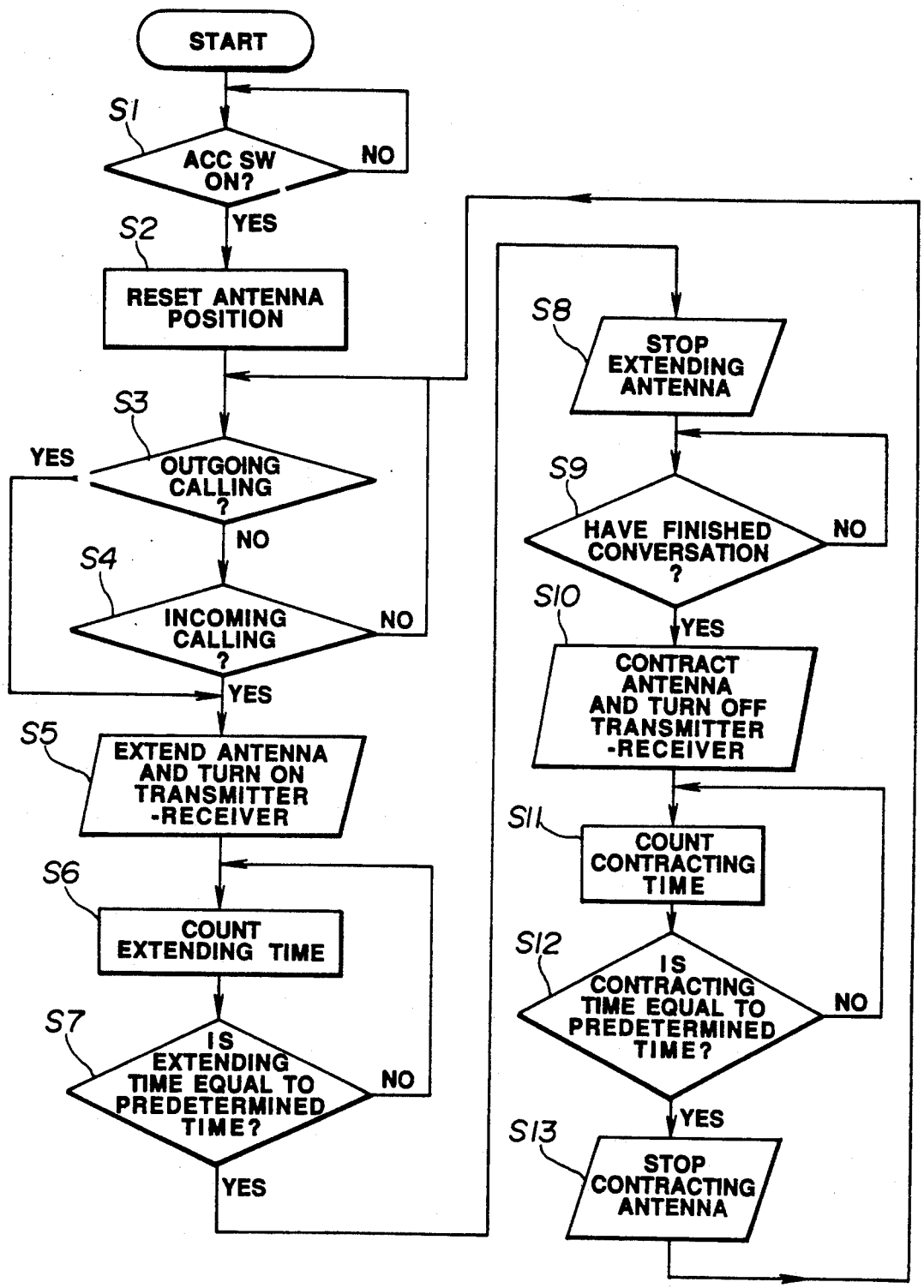
FIG. 2 is a flow chart to explain the operation of the telephone apparatus of FIG. 1.

Referring now to FIGS. 1 and 2, there is shown an embodiment of a telephone apparatus for a vehicle according to the present invention. The telephone apparatus comprises a telephone unit which includes a controller 6, a MODEM (a modulator-demodulator) 16, an incoming signal detector 4 and a transmitter-receiver 14.

A sub-antenna 2 is installed to a rear window of the vehicle in a similar manner of an installation of print-type window heater. The sub-antenna 2 is connected to the incoming signal detector 4 for detecting an incoming call signal from receipt waves by the sub-antenna 2. The incoming signal detector 4 outputs a signal to the controller 6. The controller 6 outputs a signal to the antenna controller 8 upon receipt of the signal from the incoming signal detector 4. The antenna controller 8 controls the antenna motor 10 in accordance with the signal from the controller 6 so that a main antenna 12 is extended outwardly. The main antenna 12 in an extended condition receives an incoming talking signal and sends to the MODEM 16 in which the incoming talking signal is demodulated. The demodulated signal by the MODEM 16 is outputted as a voice from a speaker (no numeral) of a conversation terminal 18 through which telephone communication is carried out. The controller 6 controls that transmitter-receiver 14 and the MODEM 16. For example, when the controller 6 detects the end of the conversation in a manner to check signals outputted from the transmitter-receiver 14 and the MODEM 16, the controller 6 outputs a signal to the antenna controller 8 to drive the antenna motor 10 so as to retract the main antenna 12.

On the other hand, when an outgoing call signal is outputted from the conversation terminal 18, the controller 6 detects the outgoing call signal and outputs a signal to the antenna controller 8 so that the antenna motor 10 is driven to extend the main antenna 12. Voice signals from the microphone of the conversation terminal 18 is modulated by the MODEM 16 and is transmitted from the main antenna 12 through the transmitter-receiver 14. The controller 6 detects the end of the telephone conversation in a manner to check signals outputted from the transmitter-receiver 14 and the MODEM 16, and outputs a signal to the antenna controller 8 to drive the antenna motor 10 in order to retract the main antenna 12.

The transmitter-receiver 14 is in a turned-off condition when the main antenna 12 is in a retracted condition. The transmitter-receiver 14 is turned on when the main antenna 12 is extended. The antenna controller 8 is provided with a counter (not shown) which counts a time that the main antenna 12 is extended from a retracted state to an extended state. In accordance with the counted time, the antenna controller 8 takes the antenna motor 10 in an operative state or in an inoperative state.

The manner of operation of the thus arranged telephone apparatus will be discussed hereinafter with reference to the flow chart of FIG. 2.

In a step S1, it is judged whether an accessory switch (ACC) for setting the telephone apparatus into an operative condition is turned on or not. When the judgement in the step S1 is "YES", the program proceeds to a step S2, and when the judgement is "NO", the program repeats the step S1. In the step S2, the main antenna 12 is set in a retracted condition (a reset condition) in which the main antenna 12 is retracted in the vehicle, and the transmitter-receiver 14 is turned off. In a step S3, it is judged whether an outgoing call signal is transmitted from the conversation terminal 18 or not. When the judgement in the step S3 is "YES", the program jumps to a step S5, and when the judgement in the step S3 is "NO", the program proceeds to a step S4. In the step S4, it is judged whether an incoming call signal is received or not. When the judgement in the step S4 is "NO", the program returns to the step S3. When the judgement in the step S4 is "YES", the program proceeds to the step S5 wherein the controller 6 outputs a signal to the antenna controller 8 to extend the main antenna 12 outwardly and controls the transmitter-receiver 14 to be turned on. Following this, in a step S6, the counter of the antenna controller 8 starts to count a time to fully extend the main antenna 12. In a step S7, it is judged whether the extending time counted by the counter is greater than or equal to a predetermined time. When the extending time is greater than or equal to the predetermined time, the program proceeds to a step S8 and wherein the main antenna 12 is stopped extending. When the extending time is not greater than the predetermined time, the program returns to the step S6 and repeats the steps S6 and S7.

In a step S9, it is judged whether the conversation through this telephone apparatus has been finished or not. When the judgement in the step S9 is "NO+, that is, when the conversation is continued, the program repeats the steps S9. When the judgement in the step S9 is "YES", the program proceeds to a step S10 wherein the controller 6 outputs a signal to the antenna controller 8 to retract the main antenna 12 and controls the transmitter-receiver 14 to be turned off. Following this, in a step S11, the counter of the antenna controller 8 starts to count a time to fully retract the main antenna 12. In a step S12, it is judged whether the retracting time counted by the counter is greater than or equal to a predetermined time. When the retracting time is greater than or equal to the predetermined time, the program proceeds to a step S13 wherein the main antenna 12 is stopped contracting. When the time is not greater than the predetermined time, the program returns to the step S11 and repeat the steps S11 and S12. After the processing of the step S13, the program returns to the step S3 and waits for the outgoing call signal or incoming call signal.

With the thus arranged telephone apparatus, since the transmitter-receiver 14 waits for an incoming call signal in a turned-off condition, the consumption of electric power is improved. Furthermore, since the sub-antenna 2 is installed to the rear window by a method which is the same as the installation method of a window heater of a print type, the telephone apparatus will be made at an inexpensive cost.

Figure 3:
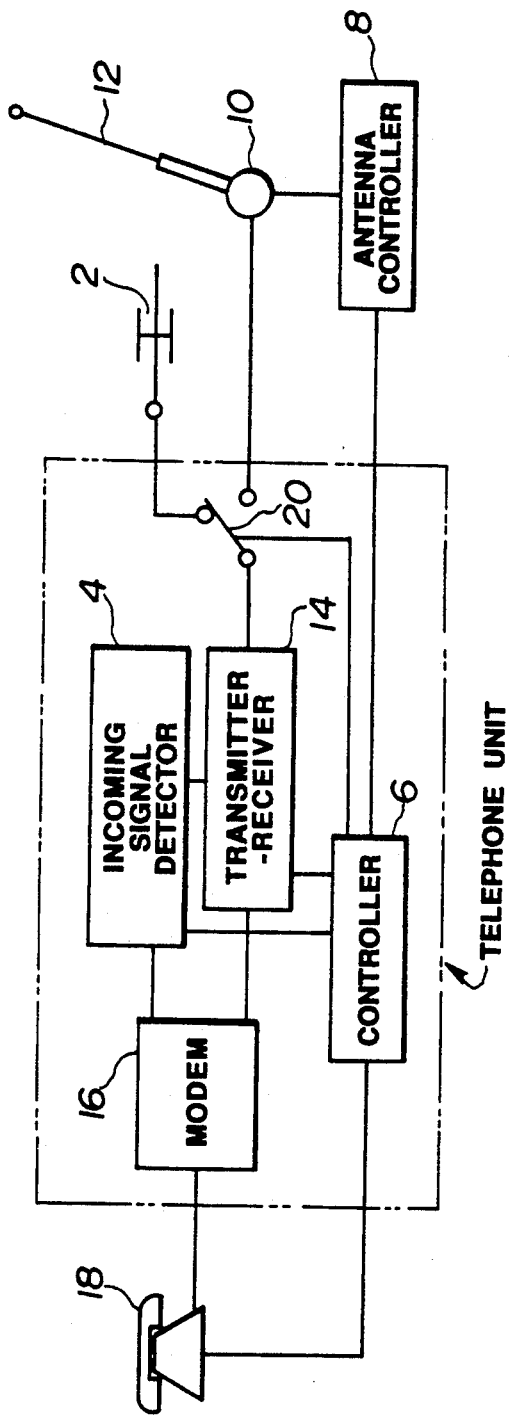
FIG. 3 is a schematic block diagram of a second embodiment of the telephone apparatus according to the present invention.

FIG. 3 illustrates a second embodiment of the telephone apparatus according to the present invention, which is similar to the first embodiment of the telephone apparatus with the exception that the sub-antenna 2 is connected to the incoming signal detector 4 through the transmitter-receiver 14. The controller 6 controls a selector switch 20 to take one of a first state in which the transmitter-receiver 14 is connected to the sub-antenna 2 and a second state in which the transmitter-receiver 14 is connected to the main antenna 12. When the incoming signal detector 4 detects the incoming signal through the sub-antenna 2, the steps S5 to S8 of the second embodiment are similarly carried out as mentioned in the explanation of the first embodiment. Accordingly, the conversation by this telephone apparatus is carried out after the main antenna 12 is extended and the transmitter-receiver 14 is turned on. This telephone apparatus is improved in the detecting ability of incoming call signals.

While the incoming signal detector 4 has been shown and described as being of an exclusive use type in the first embodiment of the present invention, the incoming signal detector 4 may use as a sub-receiver in order to get a higher reception by applying a space diversity type receiver to the incoming signal detector 4.

Although the main antenna 12 has been shown and described as being of a type which is driven by a motor in the first embodiment, it will be understood that the main antenna 12 may be of a type which is manually attached to or detached from the vehicle body if the controller informs a passenger of the necessity of the attaching of the main antenna 12 by some signals. Accordingly, the passenger may attach the main antenna 12 to the vehicle body in accordance with the incoming signal from the controller.

What is claimed is:

1. In a telephone apparatus for a vehicle, by which a telephone communication is carried out through a main antenna, said telephone apparatus including a sub-antenna receiving an incoming call wave, the improvement comprising:
    a detector detecting an incoming call signal from the incoming call wave; and
    a controller outputting to an antenna controller of the main antenna a command for extending the main antenna in response to detection of the incoming call signal by said detector.

2. A telephone apparatus as claimed in claim 1, wherein the telephone apparatus is put into a condition that a telephone communication is carried out after said controller outputs the command.

3. A telephone apparatus as claimed in claim 1, further comprising a transmitter-receiver through which telephone communication is transmitted and received, said transmitter-receiver and said main antenna being put in an operative state in accordance with the command.

4. A telephone apparatus as claimed in claim 1, further comprising a transmitter-receiver through which the telephone communication is transmitted and received, said transmitter-receiver being turned on by a first signal outputted from said controller in response to a signal outputted from said detector.

5. A telephone apparatus as claimed in claim 1, further comprising a modulator-demodulator (MODEM) which modulates an outgoing talking signal and which demodulates an incoming talking signal.

6. A telephone apparatus as claimed in claim 1, wherein said main antenna comprises variable length means for extending and contracting a length of said main antenna responsive to operation of a motor controlled by said antenna controller.

7. A telephone apparatus as claimed in claim 1, wherein said controller outputs to said antenna controller of said main antenna a command for retracting said main antenna upon detecting an end of the telephone communication.

8. A telephone apparatus as claimed in claim 4, wherein said controller outputs a second signal to turn off said transmitter-receiver upon detecting an end of the telephone communication.

9. A telephone apparatus as claimed in claim 1, wherein said controller includes a counter which counts a time for extending said main antenna from a contracted state to an extended state, said controller outputting a signal to said antenna controller of the main antenna to stop extending said main antenna when the time counted by said counter is greater than a predetermined value.

10. A telephone apparatus as claimed in claim 1, wherein said controller includes a counter which counts a time for contracting said main antenna from an extended state to a contracted state, said controller outputting a signal to said antenna controller of the main antenna to stop contracting said main antenna when the time counted by said counter is greater than a predetermined value.

11. In a telephone apparatus for a vehicle,
a main antenna for conducting telephone communication;
a sub-antenna receiving an incoming call wave;
a detector detecting an incoming call signal in the incoming call wave and outputting a signal indicative of detection of the incoming call;
a transmitter-receiver connected to said detector;
a selector switch switchable between a first state, in which said transmitter-receiver is connected to said main antenna, and a second state, in which said transmitter-receiver is connected to said sub-antenna; and
a controller controlling said main antenna to be extended into an operative state and controlling said selector switch to switch from said second state into said first state in response to the signal from said detector.

12. In a telephone apparatus for a vehicle,
a modulator-demodulator for demodulating a call wave to provide a call signal carried by the call wave;
a main antenna for conducting telephone communication, said main antenna being extended and retracted by a motor;
an antenna controller connected to said main antenna;
a sub-antenna receiving an incoming call wave;
an incoming signal detector detecting an incoming call signal in the incoming call wave and outputting a signal indicative of detection of the incoming call;
a transmitter-receiver connected to said incoming signal detector;
a conversation terminal connected to said modulator-demodulator so that a signal demodulated by said modulator-demodulator is outputted as a voice from said conversation terminal and a voice signal is outputted from said conversation terminal to said modulator-demodulator; and
said transmitter-receiver and said modulator-demodulator outputting a signal indicative of the end of conversation through said conversation terminal;
a controller responsive to said signal from said incoming signal detector for controlling said antenna controller to extend said main antenna into an operative state, said controller further responsive to the signal indicative of the end of conversation through said conversation terminal for controlling said antenna controller to retract said main antenna into the vehicle.

* * * * *